Nov. 10, 1970      D. J. CHLECK      3,539,917
METHOD OF MEASURING THE WATER CONTENT OF LIQUID HYDROCARBONS
Filed April 24, 1968      2 Sheets-Sheet 1

INVENTOR
DAVID J. CHLECK
BY
Kenway, Jenney & Hildreth
ATTORNEYS

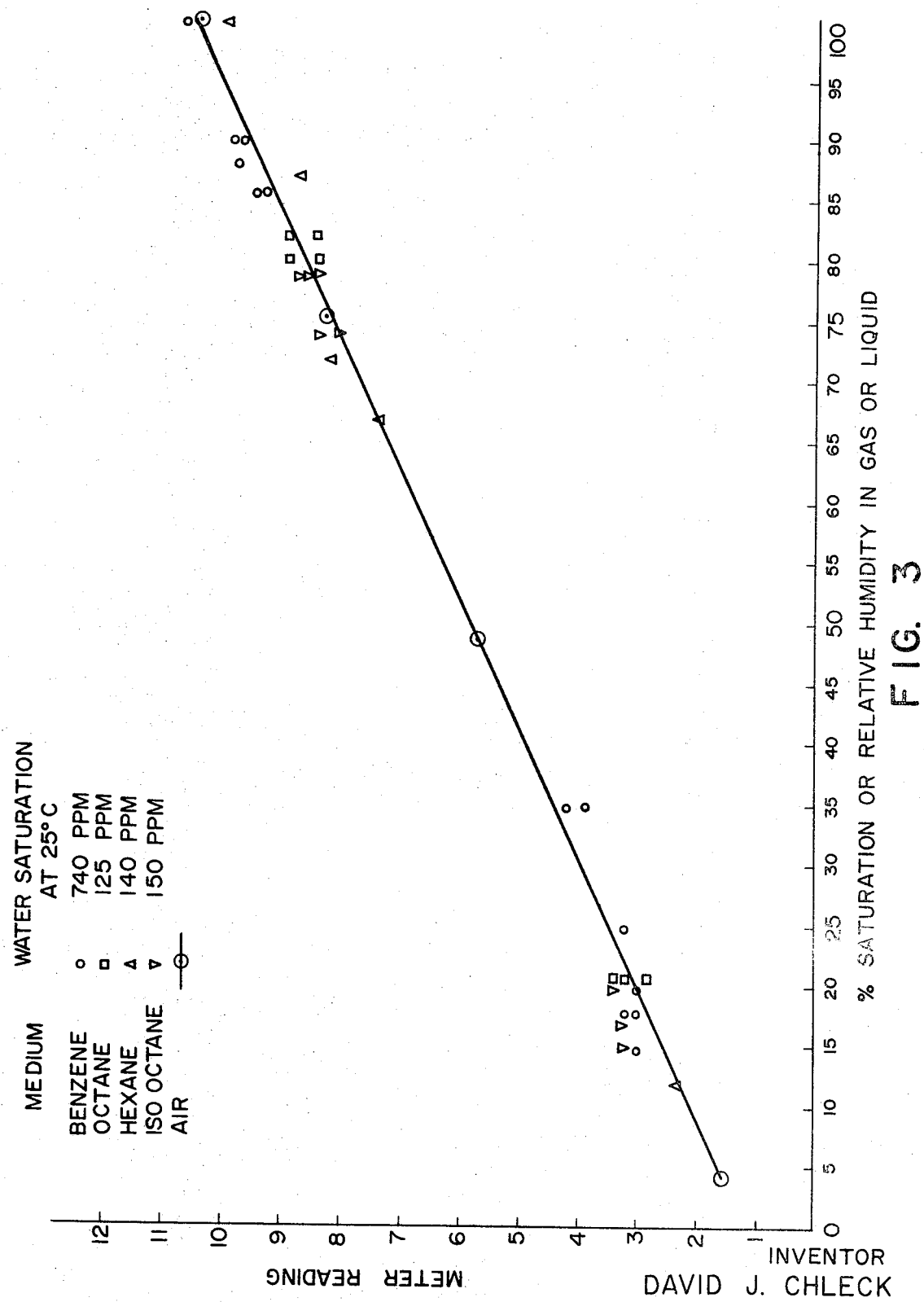

United States Patent Office 3,539,917
Patented Nov. 10, 1970

3,539,917
METHOD OF MEASURING THE WATER CONTENT OF LIQUID HYDROCARBONS
David J. Chleck, Brookline, Mass., assignor to Panametrics, Inc., Waltham, Mass., a corporation of Massachusetts
Filed Apr. 24, 1968, Ser. No. 723,828
Int. Cl. G01r 27/26
U.S. Cl. 324—61
1 Claim

ABSTRACT OF THE DISCLOSURE

A method of measuring the water content of hydrocarbon liquids by immersing a sensor within the liquid, where the sensor is formed of an aluminum oxide coating on a base electrode with a second water permeable electrode covering at least a portion of the aluminum oxide. Variations in the water content of the hydrocarbon result in variations in the impedance of the sensor. When the liquid hydrocarbon is in equilibrium with the gas space above it, the water content of the hydrocarbon may be measured by placing the sensor in the gas space and measuring its change of impedance.

FIELD OF THE INVENTION

This invention relates in general to the measurement of water vapor pressure in a hydrocarbon medium and more particularly to the measurement of water vapor pressure in liquid hydrocarbons with an aluminum oxide sensor.

BACKGROUND OF THE INVENTION

There are a number of situations in which it is desirable to measure the water content of hydrocarbon liquids. In the past, the water content has been determined chiefly by chemical titration methods, in which a sample of the hydrocarbon is removed from the medium for analysis. The analysis is carried out by titrating the sample with a suitable reagent with a resulting change in the color or electrical characteristics indicating the water content of the hydrocarbon sample. These techniques have a sensitivity limit of about $5 \times 10^{-2}$ p.p.m. Such tests are basically laboratory measurements and are not suitable for continuously monitoring the water content of hydrocarbons. Additionally, this type of measurement of the water content is difficult to instrument in terms of providing the information from remote sampling points to a single process control center. The separation of the sampling operation from the analyzing operation also introduces a possible source of error due to the change in water content within the sample from the time it was taken until the time it was analyzed. According to Henry's law the mass of gas dissolved by a given volume of solvent is proportional to the pressure of gas with which it is in equilibrium. Thus, if the gas space above the liquid sample before titration is wetter or drier than the liquid before it was sampled, or if the temperature of the gas-liquid sample differs from that of the gas-liquid temperature of the fluid before sampling, an error is introduced into the determination of water content.

SUMMARY OF THE INVENTION

Broadly speaking, the method of measurement of water vapor pressure of the present invention provides for continuous in situ measurement of water vapor by placing an aluminum oxide sensor in direct contact with either the organic liquid itself or the gas atmosphere in equilibrium with this liquid. The aluminum oxide sensor is a device which consists of a thin (approximately .00001 inch) layer of aluminum oxide coated over a base electrode, with a thin, water permeable, conductive electrode located on top of the aluminum oxide. A more complete description of this sensor is included in United States Pat. application Ser. No. 683,084 filed Nov. 1, 1967 and assigned to the assignee of this application.

This sensor operates such that the number of water molecules adsorbed by the pore walls of the aluminum oxide control the electrical conductivity of the pore wall in a manner which can be directly related to the water vapor pressure. The pore wall openings in the aluminum oxide sensor are typically less than 70 A. and hence only small molecules, such as water, may be adsorbed within these pores. Hydrocarbons, in either liquid or gaseous form, are composed of molecules too large to enter these pores and hence the sensor responds only to the water vapor pressure in the medium to which it is exposed. The sensor can be operated either directly within the liquid or, when the liquid is in equilibrium with a gas, it can be placed in the gas space. In the latter case, the medium tested can be considered to be a closed system and the same determination of water content will result whether the sensor is placed in the liquid or in the gas portion of that closed system.

BRIEF DESCRIPTION OF THE DRAWINGS

In the drawing:
FIG. 3 is a graphical illustration of the relationship between the response of aluminum oxide sensor and the percent of saturation of water in a number of different hydrocarbons.

Figure 1:
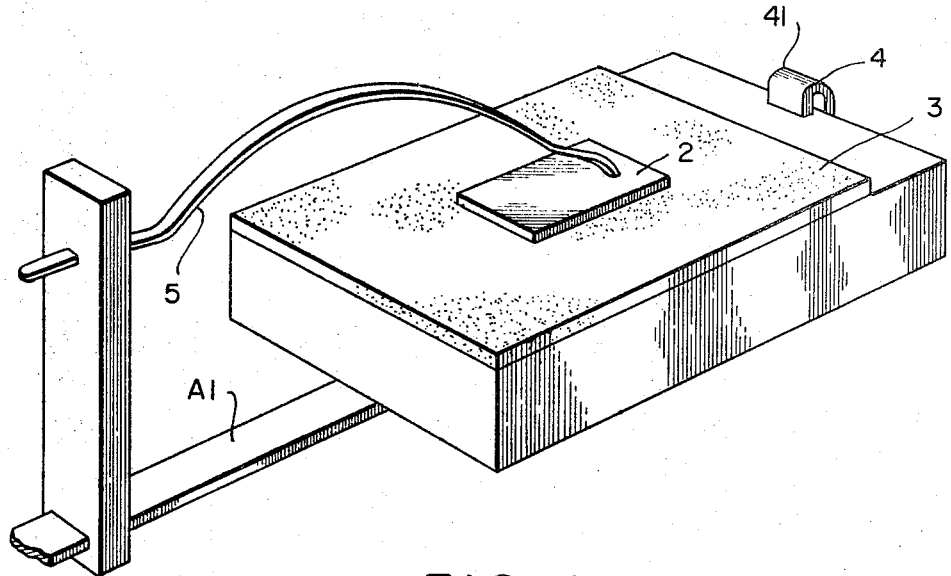
FIG. 1 is a perspective view of a humidity sensor suitable for use in the practice of this invention.

In the process of the invention, an aluminum oxide water vapor sensor, as illustrated in FIG. 1, is used as the detector element. With reference now to FIG. 1, the sensing element is shown as a laminate having a base 1 of aluminum, an upper layer 2 composed of an electrically conductive metal and an intermediate layer 3 of aluminum oxide. Connected to the base 1 and the top metal layer 2 are electrical leads 4 and 5 respectively. More particularly, the base 1 is formed preferably of hard drawn aluminum sheet of at least 99% purity. For the best results, the base 1 should be formed of a substantially uniform thickness of aluminum which may be of any thickness from about .0005 inch to about .125 inch. The upper surface of the aluminum base 1 is oxidized to form a porous aluminum oxide layer 3.

Typically the oxide layer may be formed by an anodizing process in which an alternating current is passed through a heated sulphuric acid solution containing the base plate. The amorphous aluminum oxide coating formed thereby is characterized by a regular deep narrow capillary pore structure in which each pore is approximately 70 A. wide. The material is then boiled for approximately 30 minutes in distilled water and subsequently brushed until the film thickness is reduced to approximately .00001 inch. The oxide is now converted from the amorphous form to a hard hydrated version, designated boehemite, characterized by an irregular pore structure in which the necks of the pores are considerably narrowed.

The metal layer selected for the top layer 2 will depend upon the desired characteristics of the element and is usually formed from one of the conventional deposition metals such as aluminum, copper, gold, iron, platinum, palladium or nichrome. The thickness of this top metallic layer 2 is maintained very thin, to allow passage of water vapor.

Figure 2:
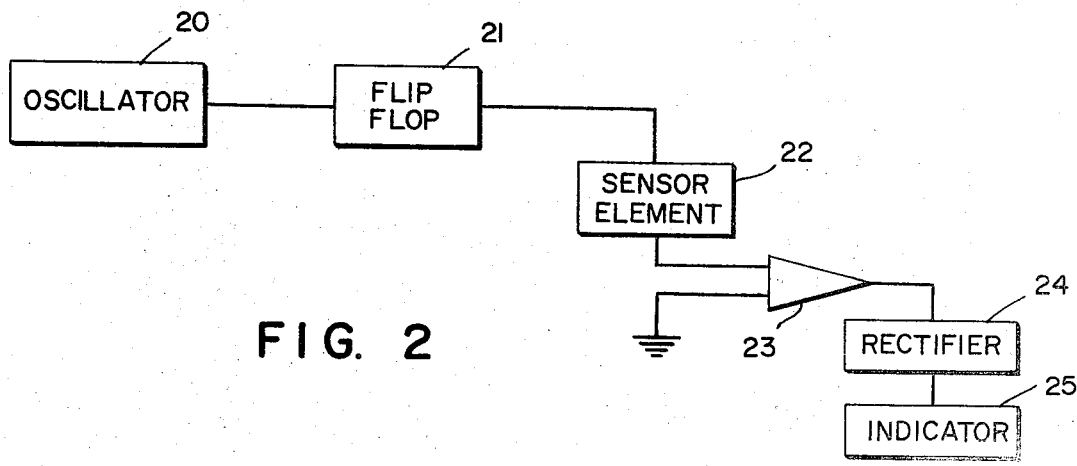
FIG. 2 is an illustration in block diagrammatic form of a measuring system utilizing the sensor illustrated in FIG. 1.

In FIG. 2, there is illustrated a typical block diagram of an electrical circuit configuration suitable for providing a measurement system operating with the humidity sensor. In this system, an oscillator 20 provides a saw-toothed waveform output to flip-flop unit 21, the latter in turn providing a square wave output through the sensor element 22 to an input terminal of an operational amplifier 23. The output from the operational amplifier 23 is supplied through rectifier 24 to a DC level indicator 25. The oscillator 20 typically operates at a frequency of 154 cycles per second and the flip-flop unit 21 produces a signal across the sensor element 22 which is in the order of ½ volt. The signal received by the operational amplifier 23 varies with the capacitance and resistance of the sensor element 22 and hence the output DC level indicated on indicator 25 varies inversely with changes in the impendance of the element. An increase in the amount of water vapor to which the sensor is exposed, results in an increase in the DC level indicated on indicator 25.

The sensor illustrated in FIG. 1 provides an output, as indicated in FIG. 3 which is related to the vapor pressure of water in a gas or liquid. The percent saturation is determined by dividing the vapor pressure of $H_2O$ measured by the probe (P) by the saturation vapor pressure of $H_2O$ at the ambient temperature of the measurement i.e.

$$\text{Percent } S = \frac{P}{P_s} \times 100$$

As can be seen from the data points of FIG. 3, not only is this response substantially independent of the hydrocarbon to which the sensor is exposed but also the values obtained for the various hydrocarbons included in that illustration are entirely consistent with the vapor pressure measurements obtained directly in air. While the hydrocarbons included in the curve in FIG. 3 are pure hydrocarbons, the device will also operate with hydrocarbon liquids containing other atoms in addition to hydrogen and carbon.

In order to determine, from the data provided by the sensor, the weight content of water within a hydrocarbon liquid, Henry's law must be applied. Henry's law states that the mass of gas dissolved by a given volume of solvent, at constant temperature, is proportional to the pressure of gas with which the solvent is in equilibrium. Stated otherwise, the weight precent of water in hydrocarbons is equal to the partial pressure of water vapor times a constant.

Thus, $$C = KP$$

where

K = Henry's law constant
C = concentration of water vapor in weight percentage
P = the vapor pressure of water measured by the sensor.

Henry's law constant must be computed separately for each liquid and is simply the saturation weight percentage of water for the liquid in question divided by the saturation vapor pressure of water, both at the temperature of measurement. When this constant is known, the weight percentage of water in a hydrocarbon is computed by multiplying the constant times the vapor pressure of the water as measured by the sensor.

Thus $$C = \frac{(C_s)P}{P_s}$$

where $C_s$ = the saturation concentration of water in fluid at the temperature of measurement and
$P_s$ = the saturation vapor pressure of water at the temperature of measurement.

According to Henry's law, the water content within the hydrocarbon liquid depends upon the gas pressure above the liquid. Thus, in order to make a meaningful determination of the water content by measurement in the gas space, the sensor must be placed into the gas within a closed system, that is, the environment including the liquid medium and the gas space above it must be in equilibrium. Under these conditions, the same measurement result will be obtained whether the sensor is placed directly into the liquid or only in the gas space above the liquid. In the gas space above the liquid, the sensor responds only to the water vapor pressure. Since the sensor acts as a semipermeable member, accepting water vapor but not the solvent, its insertion within the liquid creates a separate interface and its output electrical signal is responsive, at a given temperature, only to the water vapor pressure and hence the output signal in both locations is the same. When the water content of the liquid is measured by direct immersion, the liquid and gas need not, however, be in equilibrium.

A sensor as described will measure a change in moisture content from 20,000 micrograms of water per liter to .001 micrograms of water per liter. For measurements made at an ambient temperature of 20° C., it should be possible to measure percent saturation levels to as low as $5 \times 10^{-6}\%$. In liquids which have a saturation level of 100 parts per million by weight at a temperature of 20° C. (typical values for a straight chain hydrocarbon) water content can be determined to values as low as $5 \times 10^{-6}$ p.p.m. Such values are several orders of magnitude of lower than those obtainable by the complex chemical sampling and titrating methods available in the prior art. There are a number of hydrocarbons for which the water saturation weight percentage is not readily available in the literature. For these liquids, the percent saturation can be obtained simply by dividing the water vapor pressure measured by the sensor by the saturation vapor pressure of water at the temperature of measurement and multiplying this ratio times 100.

This method of measuring the water vapor concentration is operable over a range of ambient temperatures from +60° C. to −110° C. For some liquids, Henry's law constant varies with temperature while for others, including many of the simple straight chain saturated hydrocarbons, Henry's law is not affected by temperature. In those cases where Henry's law constant is temperature dependent it is known that classes of compounds will change in a very similar manner. For example, Henry's law constant for aromatics and olefins, will increase about 3.5% per degree centigrade over the range from 0° C. to 50° C. If the saturation value at a given temperature is known, then it is possible to closely estimate the value of Henry's law constant at different ambient temperatures.

The method of measuring the water content of liquids described herein is particularly suitable for continuous moisture measurement of liquids and also the method lends itself to monitoring remotely located processes from a central station. Measurement can be made either under static conditions or under flow conditions typically with a linear velocity of liquid less than 1 centimeter per second.

Having described the invention various improvements and modifications will now occur to those skilled in the art and the invention should be construed as limited only by the spirit and scope of the appended claims.

What is claimed is:

1. The method of determining the dissolved water content in a hydrocarbon medium comprising the steps of:
   placing a sensor within said hydrocarbon medium, said sensor being formed with a base electrode, said coating having a thickness of substantially .00001 inch and being formed with pores therein having pore diameters less than 70 A., and a water permeable second electrode covering at least a portion of said aluminum oxide coating; and measuring the impedance of said sensor between said electrodes as an indication of the water vapor pressure within said medium.

References Cited

UNITED STATES PATENTS

| | | | |
|---|---|---|---|
| 2,679,027 | 5/1954 | Clark | 324—65 |
| 3,037,374 | 6/1962 | Messinger | 73—61.1 |
| 3,121,853 | 2/1964 | Jason et al. | 338—35 |
| 3,075,385 | 1/1963 | Stover | 73—335 |
| 2,237,006 | 4/1941 | Koller | 73—336 X |
| 3,238,452 | 3/1966 | Schmitt et al. | |

OTHER REFERENCES

Cutting, C. L., A. C. Jason and J. L. Wood, A Capacitance-Resistance Hygrometer, in Journal of Scientific Instruments, vol. 32, pp. 425–431, November 1955, Q184J.7.

Hausmann, Erich, and Edgar P. Slack, Physics, D. Van Nostrand Company, Inc., New York, 1939, p. 255.

E. E. KUBASIEWICZ, Primary Examiner